United States Patent [19]

Schweickhardt

[11] Patent Number: 5,115,796
[45] Date of Patent: May 26, 1992

[54] DIAMOND ABRASIVE SAW BLADE AND METHOD OF DRY SAWING CONCRETE

[76] Inventor: Karl B. Schweickhardt, 179 Spring Oaks Dr., St. Louis, Mo. 63011

[21] Appl. No.: 584,980

[22] Filed: Sep. 20, 1990

Related U.S. Application Data

[60] Division of Ser. No. 405,100, Sep. 8, 1989, Pat. No. 4,962,748, which is a continuation of Ser. No. 118,858, Nov. 9, 1987, abandoned.

[51] Int. Cl.⁵ .............................................. B28D 1/04
[52] U.S. Cl. .............................. 125/13.01; 51/209 R; 51/206.4
[58] Field of Search .............. 125/13 R, 12, 15, 13.01; 51/209 R, 206, 206.4, 207, 204, 281 R, 281 SF; 29/530

[56] References Cited

U.S. PATENT DOCUMENTS

| | | | |
|---|---|---|---|
| 2,877,105 | 3/1959 | Smith | 51/206 R |
| 3,205,624 | 9/1965 | Weiss | 51/206 |
| 3,469,016 | 9/1969 | Shelton | 174/36 |
| 3,656,468 | 4/1972 | Welden | 125/13.01 |
| 3,990,338 | 11/1976 | Wikner et al. | 83/835 |
| 4,718,398 | 1/1988 | Hallez | 125/15 |

FOREIGN PATENT DOCUMENTS 1087078 of 1953 France.

*Primary Examiner*—M. Rachuba
*Attorney, Agent, or Firm*—Polster, Lieder, Woodruff & Lucchesi

[57] ABSTRACT

A diamond abrasive saw blade for the dry sawing or cutting of concrete, masonry or the like is disclosed. The saw blade comprises a flat, circular plate having a central mounting hole and having a diamond abrasive matrix rim on the outer periphery of the plate. The plate has a plurality of apertures therethrough spaced around the plate between the mounting hole and the diamond abrasive rim. A coating is applied to at least one face of the plate with this coating substantially filling the apertures for aiding in the securing of the coating to the plate. This coating includes abrasive particles with the thickness of the abrasive particles, the coating, and the plate being less than or equal to the thickness of the diamond abrasive matrix rim.

A method of abrasively dry cutting or sawing of masonry or concrete utilizing such a saw blade is also disclosed.

2 Claims, 2 Drawing Sheets

DIAMOND ABRASIVE SAW BLADE AND METHOD OF DRY SAWING CONCRETE

This is a divisional of copending application(s) Ser. No. 07/405,100 filed on Sep. 8, 1989 now U.S. Pat. No. 4,962,748 which is a continuation of U.S. patent application Ser. No. 118,858 filed Nov. 9, 1987 now abandoned.

BACKGROUND OF THE INVENTION

This invention relates to an abrasive saw blade, and more particularly to a diamond abrasive saw blade which uses a diamond abrasive matrix on its outer perimeter and which is useful for the dry cutting of concrete or other masonry materials.

Generally, a diamond abrasive concrete or masonry saw blade has a flat, circular plate which serves as a substrate or body for the saw blade. An enlarged rim of a diamond particle matrix is secured (e.g., welded) to the outer periphery of the circular plate. This diamond particle/matrix rim comprises a suitable matrix, such as a suitable synthetic resin material or a suitable metal (e.g., copper), having numerous diamond particles of a predetermined size uniformly distributed throughout the matrix. This diamond abrasive matrix rim is of a predetermined depth such that the circumference of the rim is greater than the diameter of the circular plate. Further, the rim has a width or thickness from one side face thereof to the other greater than the thickness of the plate. The diamond abrasive/matrix rim may be secured to the outer periphery of the plate in any suitable manner, such as by laser or electron beam welding.

Typically, such prior art diamond abrasive saw blades are mounted on the drive shaft of a power driven saw and are driven at a relatively high rotational speed such that when the saw blade is brought into working engagement with the work to be cut (e.g., a slab of masonry or concrete), the partially exposed diamond particles on the outermost surfaces of the saw blade abrasively engage and cut into the work. With prior art diamond abrasive concrete saws, a stream of suitable cooling fluid (preferably water) is discharged onto the rotating saw blade, generally above the work and at the front end of the blade for the dual purpose of cooling the saw blade and of carrying away the small particles or chips of the work abrasively cut by the diamond particles.

In the construction of concrete highways or the like, concrete is oftentimes poured as a monolithic slab without traditional expansion joints at pre-determined intervals between separate slabs. It is now conventional to saw or cut the "green" or partially cured monolithic concrete slab at pre-determined intervals shortly after the concrete has hardened (i.e., about 6–16 hours after pouring of the concrete). For example, in a monolithic slab of a highway lane, the monolithic poured slab is partially cut in transverse direction at regular intervals (e.g., every 20–30 feet). The depth of these cuts may range about 2–4 inches for a slab having a thickness between about 8 and 12 inches. After partially cutting the monolithic slab along these prescribed transverse cuts, the slab will then crack along these predetermined transverse cuts. The predetermined cutting and cracking of the slabs along the lines of cutting prevents random cracking of slabs. After sawing, the grooves sawed in the slab are filled with a suitable filler/sealer material (e.g., an elastomeric type material) which prevents water from entering the groove and the crack and, in turn, prevents damage to the concrete caused by the freezing of water within the groove.

Further, in the localized repair of highways, it is oftentimes necessary to remove a portion of the pavement for the repair. This oftentimes necessitates sawing away of a portion of the old concrete highway to be repaired.

Typically, the saws utilized to cut such grooves in a concrete highway or to cut away parts of the highway for repair purposes, are large, self propelled saws. Such saws include a powerful engine which rotatably drives the saw blade at a high rotational speed with the rim of the saw being rotated at a high surface speed. Oftentimes the saw is power driven along a desired line of cutting at a predetermined speed or feed rate. The saw blade may be selectively raised and lowered with respect to the concrete to be cut.

As mentioned, such prior art diamond abrasive saws required the use of water or other fluid as a coolant for the saw blade and as a medium for carrying the chips of concrete cut by the diamond particles. This requirement of supplying such coolant water to the saw blade at a remote construction site presented a considerable expense, required a substantial capital investment, and consumed expensive labor.

The length of cutting typically realized, utilizing a prior art diamond abrasive blade in green concrete with the use of coolant water varied greatly, depending on the hardness of the aggregate in the concrete, the state of the fully uncured concrete, and the depth of the cut. For example, utilizing a prior art diamond abrasive saw blade having a diameter of 14 inches and having a diamond abrasive rim approximately 3/16 of an inch (0.187) inches wide and being driven by the saw at a rotational speed of about 2600–3300 rpm (i.e., at a surface speed of about 9,525–12,087 feet per minute) will yield about about 4,000–12,000 lineal feet of cutting. Feed rates of up to about 17 feet per minute may be achieved.

In concrete or other masonry materials having a relatively soft aggregate, an abrasive saw blade (as opposed to a diamond blade) may be utilized. Such abrasive typically have fiberous substrate fibers or the like with suitable abrasive particles of silicon carbide or the like held in place on the fiberglass substrate by suitable synthetic resin which impregnates the fiberglass substrate and which securely holds the particles in place. Typically, such an abrasive saw blade is utilized without a cooling fluid. However, such abrasive saw blades are not able to cut concrete having a hard aggregate.

There has been a long standing need for a concrete or masonry saw blade which will readily cut hard aggregate concrete or masonry materials at rates of feed comparable to prior art diamond saw blades, but without the necessity of supplying coolant water to the saw.

SUMMARY OF THE INVENTION

Among the several objects and features of the present invention may be noted the provision of a diamond saw blade which will cut hard aggregate concrete and other masonry materials at speeds and depth of cut similar to prior art diamond saw blades, but without the requirement of coolant water or other cooling fluids, and which will result in comparable cutting lengths and cutting speeds as prior art water cooled diamond abrasive saw blades;

The provision of such a diamond saw blade which has an abrasive coating secured (i.e., bonded) to at least one face of the saw blade (i.e., a circular metal substrate plate) for blocking the flow of heat radially inwardly of the saw blade;

The provision of such a saw blade in which the abrasive coating is at least in part is mechanically interlocked to the substrate plate of the saw blade;

The provision of such a saw blade in which the abrasive material is applied, in one preferred embodiment, to only one face of the saw blade thereby to at least in part counteract the tendancy of the saw blade to track in transverse direction with respect to a desired line of cutting for the saw blade;

The provision of such a method of cutting concrete or masonry which does not require the use of cooling water or other fluid; and The provision of such a saw blade which may be readily manufactured utilizing standard manufacturing techniques, which is of moderate cost, which has an acceptable life under a wide variety of cutting conditions, which is reliable in operation, and which is economical to manufacture.

Other objects and features of this invention will be apparent and in part pointed out hereinafter.

Briefly stated, a diamond abrasive saw blade for the dry cutting of masonry or concrete of the present invention comprises a flat, circular plate having a central mounting hole and a diamond abrasive/matrix rim on the outer periphery of the plate. The plate has an abrasive coating secured or bonded to at least one face of the plate with the thickness of the abrasive plating and the coat being less than or equal to the thickness of the diamond/matrix rim.

The method of the present invention of dry cutting concrete or other masonry materials comprises mounting a circular abrasive saw blade on a rotatably driven drive shaft of a power saw or the like with the blade having a flat, circular plate and a diamond/abrasive matrix ring on the outer periphery of the plate. The plate further has an abrasive coating applied to at least on face thereof with the thickness of the coating and the plate being less than or equal to the thickness of the rim. The saw is moved along a desired path and is mounted on the saw such that the blade has a top and a front with the front being toward the direction of movement of the saw. The saw blade is then forcibly rotated in one rotary direction such that the top of the blade rotates towards the front of the blade and then the blade is lowered into working engagement with the concrete to be sawed and moved with the saw forward without the application of a coolant liquid to the saw blade.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
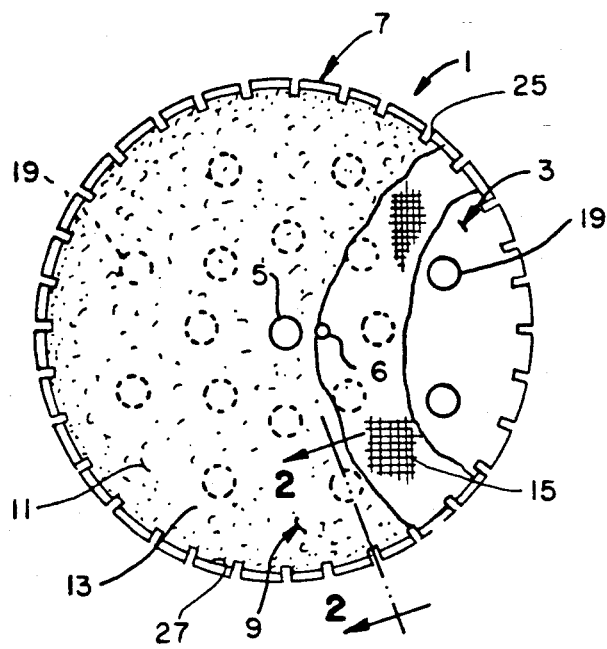
FIG. 1 is a side elevational view of a dry cutting diamond/abrasive saw blade of the present invention having portions of the coating on one face of the saw blade broken away to illustrate details of construction.
Figure 2:
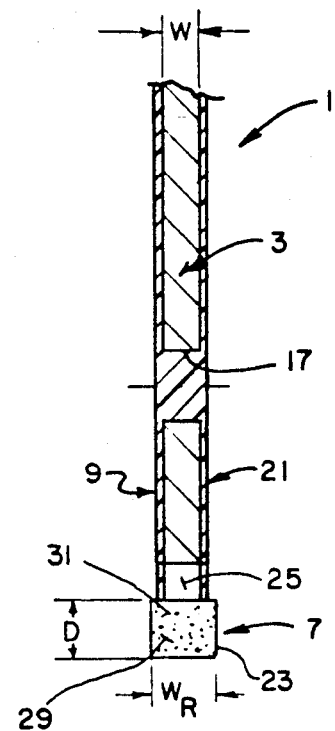
FIG. 2 is a cross sectional view on an enlarged scale taken along line 2—2 of FIG. 1 illustrating the diamond abrasive/matrix rim of the saw, on an abrasive coating applied to at least one face of the saw blade in a preferred manner of at least partially mechanically interlocking the abrasive coating to the blade plate or substrate.
Figure 5:
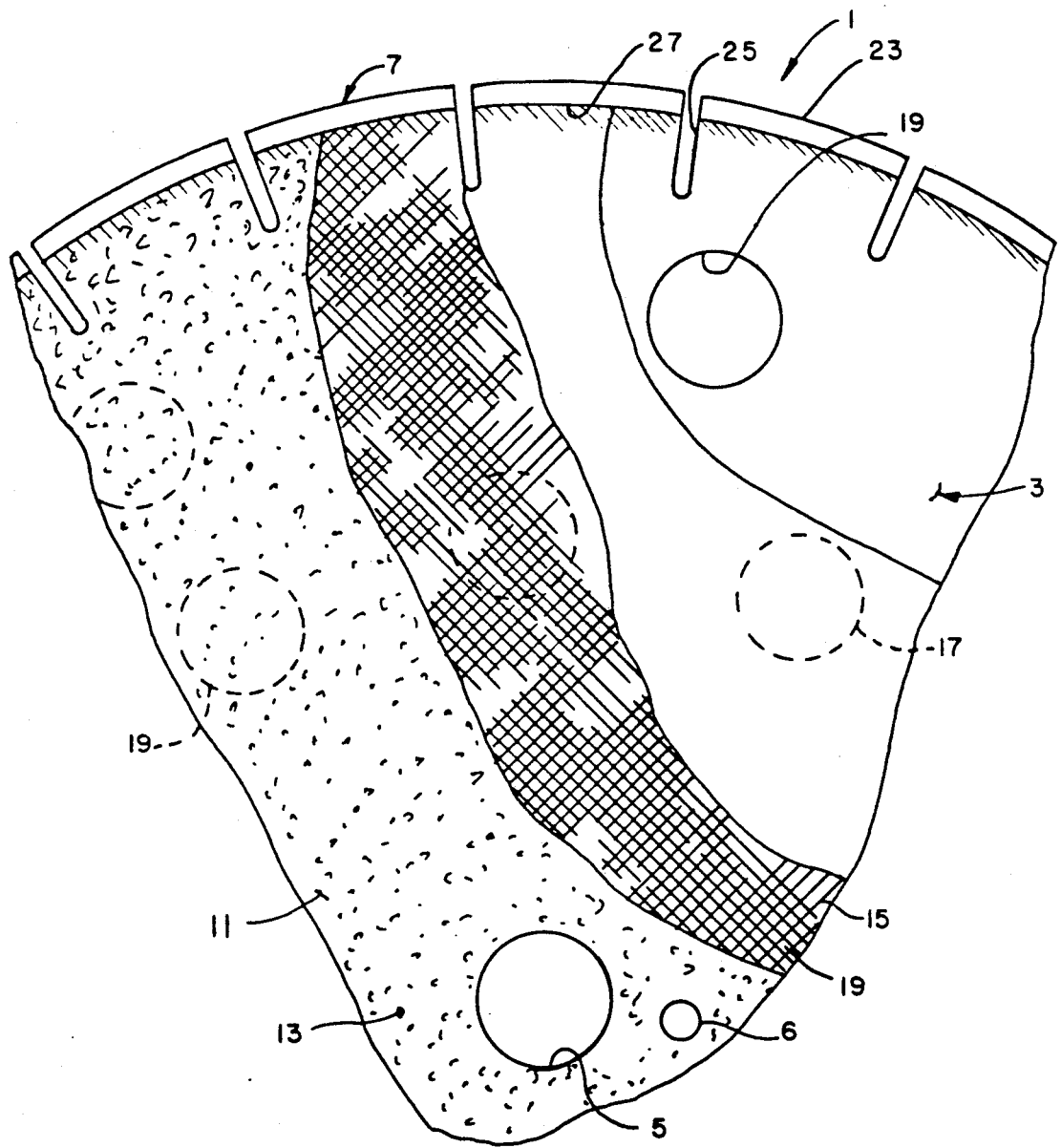
FIG. 5 is an enlarged segment of the saw blade illustrated in FIG. 1 illustrating details of construction.

Referring now to the Drawings, and more particularly to FIGS. 1, 2, and 5, a diamond abrasive saw blade for the dry cutting of concrete or other masonry materials is indicated in its entirety by reference character 1. More specifically, saw blade 1 comprises a circular substrate plate 3, preferably of a suitable steel or the like. Plate 3 has a central arbor hole 5 therein for mounting the saw blade on the arbor shaft of the saw. A drive pin hole 6 is radially offset from arbor hole 5 with this drive pin hole 6 receiving a suitable drive pin (not shown) carried by the saw for positively engaging the saw blade and causing the saw blade to rotate with the drive shaft of the saw.

As indicated at 7, a diamond abrasive/matrix rim is provided on the outer periphery of plate 3 with this diamond abrasive/matrix rim constituting the cutting surface for saw blade 1. This diamond abrasive/matrix may be of conventional materials, the general composition of which will be hereinafter described.

Further, the rotary dry cutting saw of the present invention includes an abrasive coating 9 on least one face of substrate plate 3. However, it is to be understood that such a coating 9 (or another coating) may be provided on the other face of the substrate. More specifically, abrasive coating 9 comprises a binder 11 having suitable abrasive particles embedded therein and fixedly held in place in place by the binder. For example, binder 11 may be a suitable synthetic resin material and abrasive particles 13 may be suitable silicon carbide abrasive particles. However, it is to be understood that the abrasive coating 9 may be comprised of a metallic binder with suitable abrasive particles embedded therein, a flame-sprayed-in place binder having abrasive having particles therein, or a coating of a suitable hardenable ceramic material having abrasive particles therein. As noted, binder 11 is preferably a synthetic resin binder such as is conventionally utilized with abrasive saw blades and which is commercially available from Bullard Abrasive Products, Inc., of Westboro, Mass.

As best shown in FIGS. 1 and 5, coating 9 further includes a glass fiber reinforcing mat 15 which is impregnated with the above noted suitable synthetic resin material 17. The glass fiber reinforcing mat 15 greatly strengthens abrasive coating 9 and aids in holding the abrasive particles 13 in synthetic resin binder 11.

Preferably (but not necessarily) substrate plate 3 includes a plurality of apertures 19 of any desired shape through the substrate with these apertures being substantially filled with abrasive coating 9 (and more particularly with binder 11 and abrasive particles 13) for at least in part mechanically interlocking coating 9 to its respective one face of substrate plate 3. Optionally, a second coating 21 may be provided on the other side of plate 3 opposite coating 9 such that the coating substantially filling apertures 19 provides a mechanical interlocking of coating 9 with coating 21 through the saw blade at predetermined locations around the substrate plate 3.

Referring now to FIGS. 1, 2, and 5, a more detailed description of the construction of saw blade 1 will be provided. Plate 3 is preferably a metallic plate of a suitable high strength steel alloy or the like. The substrate plate 3 may be of generally any desired diameter and the thickness of the plate is selected so as to provide sufficient strength to withstand centrifugal forces when the saw blade is driven at relatively high rotational speeds (e.g., about 2600-3300 rpm or more). For example, for a fourteen inch diameter saw blade 1, plate 3 may have a thickness of about ⅛ (0.125) inches. Diamond abrasive/matrix rim 7 is shown to comprise a plurality of rim segments 23. Plate 3 is provided with a plurality of radial slots 25 extending radially inwardly from rim 7 a pre-determined depth with rim segments being substantially equal to the arc length of the saw blade between radial slots 25. Rim segments 23 are secured to the outer perimeter of plate 3 such as by laser or electron beam welds 27. While, in FIGS. 1, 2, and 5, saw blade 1 is illustrated with radial slots 25, it will be appreciated that on certain abrasive saw blade 1 of the present invention, and preferably smaller diameters of such saw blades, radial slots 25 may not be required or may not be desirable.

The composition of diamond abrasive/matrix rim segments 23 are of conventional diamond/matrix composition, such as are readily available from the N. E. D. Corp. of Worcester, Mass. These rim segments include a matrix of suitable synthetic resin material or a suitable metallic material, such as copper. The matrix of the rim is indicated by reference character 29 in FIG. 2. Uniformly distributed throughout the rim are a multiplicity of diamond particles 31 which are bound in place by matrix 29 and which are uniformly distributed across the face of each of the segments 23 and which are further uniformly distributed throughout the segment.

It will be appreciated that, during cutting operation with the saw blade, certain of the diamond particles on the outer most face of rim segments 27 are exposed and are rigidly held on the rim segments by matrix 29. As these exposed diamond particles 31, having sharp cutting edges (not shown) thereon, cuttingly engage the work (concrete or masonry material) to be cut, the cutting edges of the diamond particles 31 cut small, almost microscopic, chips from the work. Due to the large number of the diamond particles on rim 7 and due to the high surface speeds at which blade 1 is driven, effective cutting of the work at relatively high feed rates (as high as, for example, 17 feet per minute) may be achieved at suitable working depths (e.g., 2½-3 inches).

As shown in FIG. 2, the width, as indicated W, of plate 3, plus the thickness of coating 9 on one face of the plate, plus the thickness of coating 21 on the other face of the plate, is less than or equal to the thickness of rim 7, as indicated at $W_R$. In this manner, it is assured that the entire width of the blade will fit comfortably within the groove G cut in the concrete C being cut without undue binding or friction of the inner reaches of the blade on the side walls of the groove being cut in concrete slab C.

As illustrated best in FIG. 2, abrasive coating 9 is applied on one face of the saw blade 1 of the present invention. While the abrasive coating 9 may also be applied to the opposite face of substrate plate 3, it is sometimes preferred that another coating 21, not having abrasive particles therein, be provided on the other side of the saw blade so as to obtain a more straight line cutting action as will be hereinafter described. However, the reasons for which such desirable straight line cutting action occurs is not fully understood.

Figure 3:
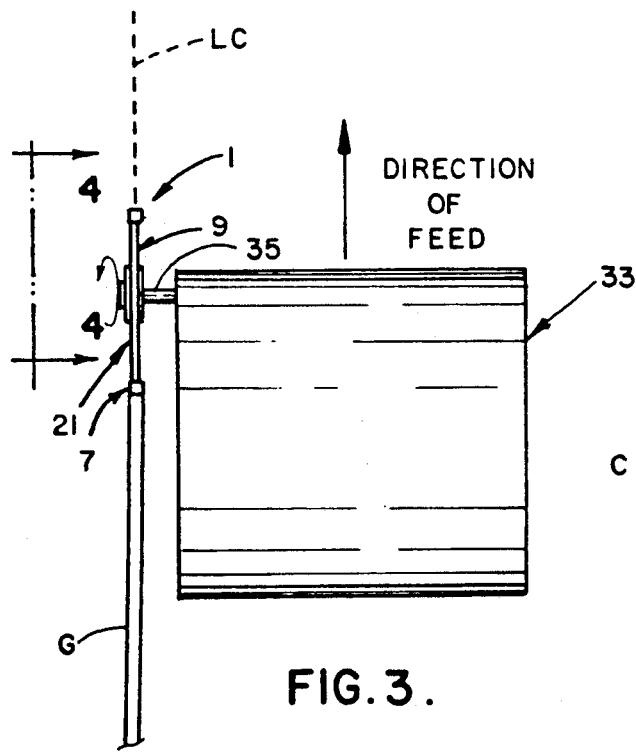
FIG. 3 is a semi-diagramatic representation of a power operated and power driven saw, in top plan, illustrating a direction of movement or feed of the saw, with a saw blade of the present invention mounted on a rotatably driven drive shaft for cutting a groove along a desired line of cutting.

Referring to FIG. 3, a power driven and power fed saw, as generally indicated at 33, moves along the upper surface of a concrete slab C in which a groove G is to be cut along a desired line of cut LC. Saw 33 has a power driven, rotary arbor shaft 35 on which saw blade 1 of the present invention is mounted for rotation with the arbor shaft. The arbor shaft is received on center mounting hole 5 and a drive pin (not shown) carried by the arbor shaft engages drive pin hole 6 thereby to insure that the saw blade 1 rotates with the arbor shaft. Preferably, but not necessarily, blade 1 of the present invention is utilized having abrasive coating 9 on one face thereof and having a non-abrasive coating 21 on the other face thereof. Preferably, this saw blade 1 is disposed on arbor shaft 35 such that abrasive coating 9 faces inwardly toward the longitudinal center line of saw 33. It has been found that with saw blade 1 having its abrasive side facing inwardly and having its non-abrasive side 21 facing outwardly, straighter lines of cut and straighter grooves G may be more uniformly and predictably formed.

Figure 4:
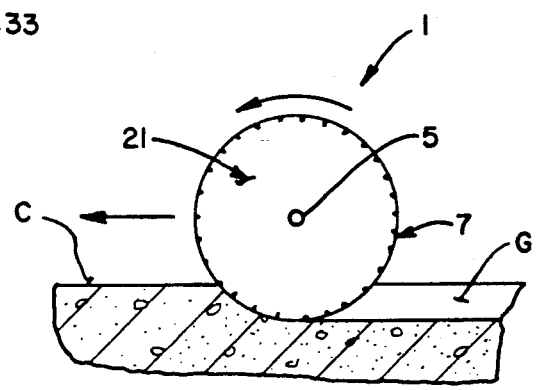
FIG. 4 is a side elevational view of the saw blade shown in FIG. 3 illustrating a direction of feed for the saw blade together with its rotational direction.

As is conventional, power driven saws 33 includes means (not shown) for raising and lowering saw blade 1 relative to the upper surface of concrete slab C which is to be cut. The blade may be lowered into working or cutting engagement with the concrete C and forcibly held at a desired level with respect to the concrete slab so that the groove G cut in the slab is of a predetermined and uniform depth. As viewed in FIG. 4, saw blade 1 is preferably rotated such that the top of the blade rotates downwardly toward the leading edge groove G being cut in concrete slab C. In other words, the top of the blade rotates downwardly toward the direction of feed or travel of the blade, as indicated by the arrows in FIG. 2. In this manner, the diamond abrasive particles 31 held on the abrasive rim 7 of saw blade 1 cuttingly engage concrete slab C and rotate downwardly into the groove thereby to discharge the cuttings from the work into the groove. It will be understood that the radial slots 25 provide sufficient space for excess cuttings to be entrained therein and that these slots bring the cuttings upwardly out of groove G. It will also be understood that these radial slots 25 serve the purpose of preventing a build up of the cuttings within groove G on the outside, exposed faces of substrate plate 3 adjacent rim 7 where these cuttings could cause excessive wear of the substrate plate 3 thus significantly shortening the service life of saw blade 1.

As previously mentioned, apertures 19 in substrate plate 3 permit the binder 11 of coating 9 on one face of the blade and coating 21 on the other face of the blade to be at least in part mechanically interlocked so as to aid in securing the coatings to their respective faces of plate 3. As previously noted, it is believed that the provision of the abrasive coating 9 on one or both faces of the saw blade increases the wear life of the saw blade by preventing the chips of concrete or masonry removed by the diamond abrasive particles 31 from causing undue wear on the substate plate. Additionally, the increased thickness of the abrasive coating 9 on at least one face of the saw blade, preferably the inside face of the saw blade relative to saw 33, (as shown in FIG. 3), aids in maintaining a straight line of cut LC. It has been found that if the abrasive coating 9 is placed on the outside face of the saw relative to the saw, the blade will tend to pull the saw blade from its intended line of cut LC.

By way of example, a blade of this invention, generally similar to that shown in FIGS. 1 and 2, having an abrasive coating 9 only on one face of the saw blade with the binder of the coating being a suitable synthetic resin and with the abrasive particles 13 being a silicon carbide, was installed on a self propelled thirty five horsepower saw. This saw was heretofore used for conventional wet cutting diamond blades. The saw blade 1 had a diameter of 14 inches and was driven at about 4356 rpm and at a surface speed of about 15,990 feet per minute. No changes, other than the installation of the blade 1 of the present invention in place of the wet cutting diamond blade, were made to saw 33. The concrete to be cut was green concrete approximately 6 hours old with native limestone aggregate from the Norfolk, Va. area. The cutting depth was 2½ inches and the cutting feed rate was approximately twelve feet per minute. The blade 1 of the present invention was found to cut this green concrete at approximately the same feed rates as water cooled diamond blades, except no water cooling was used. An examination of the dry cutting blade 1 of the present invention after testing showed that it would yield approximately same service life as wet cutting diamond blades. This same blade was also tested in fully cured concrete having a hard native river run aggregate. The depth of cut in the old concrete was 2½ inches deep and the rate of feed was approximately 10 feet per minute. These cuts were made without cooling water and the saw blade 1 of the present invention appeared to perform as well as prior art diamond abrasive blades which required cooling water.

In addition to the abrasive coating 9 protecting substrate plate 3 from excessive wear, it is believed that the abrasive coating 9, possibly in conjunction with securement holes 19, aid in limiting the transfer of heat to the saw blade such that the requirement of cooling water or other fluid is eliminated while maintaining the blade in "tension" as it is rotated at high operational speeds thereby to maintain a straight line of cutting. Specifically, it is believed that by providing apertures 19 and sub-strate plate 3 that these apertures constitute heat transfer discontinuities in plate 3 which effectively block the inward, radial flow of heat from the rim 7 of blade 1 toward the center of the saw blade. This, in turn, enables the sub-strate plate 3 to remain at a lower temperature and thus will maintain strength when under tension due to the high centrifugal loading due to the fast spinning action of the saw blade when mounted on a saw. Additionally, the coatings on the faces of the plate tend to insulate the plate from heat being transferred directly into the side faces of the plate.

In view of the above, it will be seen that the various objects and features of this invention are achieved and other advantageous results obtained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of dry cutting concrete or masonry materials without the use of a coolant liquid comprising the steps of:

mounting a circular abrasive saw blade on a rotary drive shaft of a power driven saw, said saw blade having a flat, circular metal plate including a central mounting hole and a diamond abrasive matrix rim on the outer periphery of said plate, said plate having a coating applied to at least one face thereof;

rotating said blade in one rotary direction; and moving the diamond abrasive matrix rim of said saw blade into working engagement with said work to be sawed and moving said saw along a desired path so as to cut said work without the application of a cooling liquid to said saw blade and so as to maintain tension on said metal plate during said dry cutting of said concrete.

2. The method of claim 1 wherein said saw blade has said coating on only one face thereof, said method further comprising mounting with said coating facing inwardly towards said saw.

* * * * *